Aug. 28, 1951 — M. MORGAN — 2,565,927
APPARATUS FOR HANDLING ANNULAR ARTICLES
Filed June 28, 1947 — 3 Sheets-Sheet 2
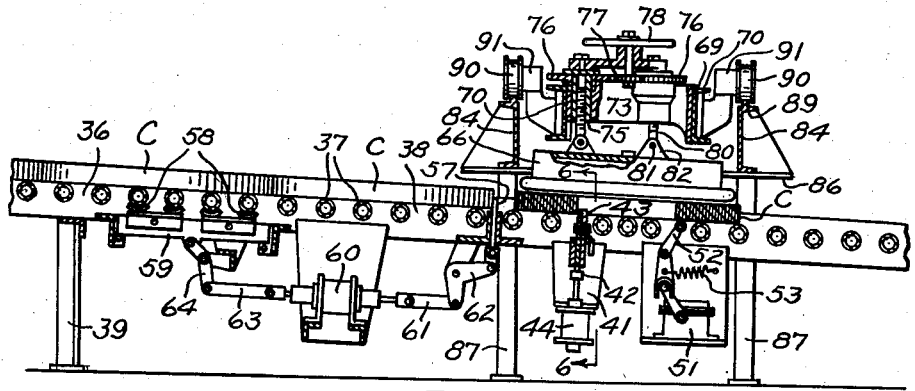
Fig. 4
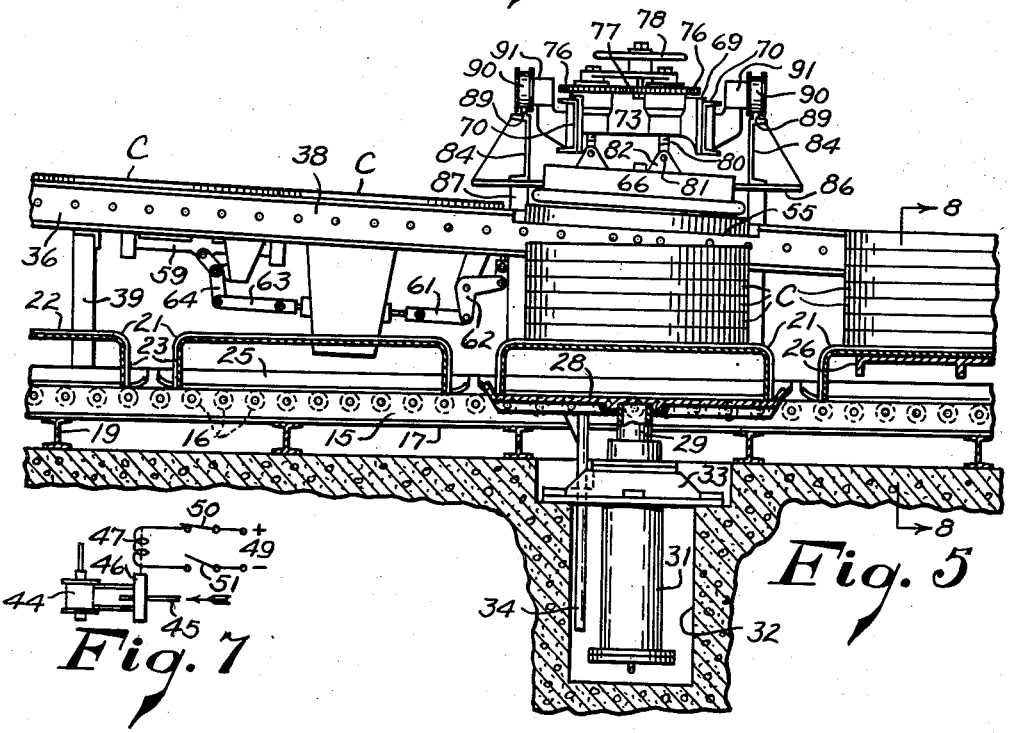
Fig. 5
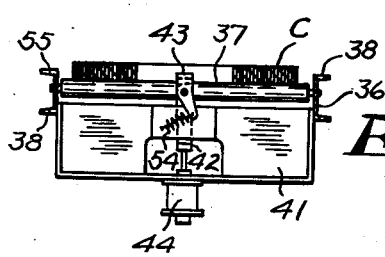
Fig. 7
Fig. 6
INVENTOR.
MYLES MORGAN
BY
ATTORNEY INVENTOR.
MYLES MORGAN
BY
Albert G. Blodgett
ATTORNEY Patented Aug. 28, 1951

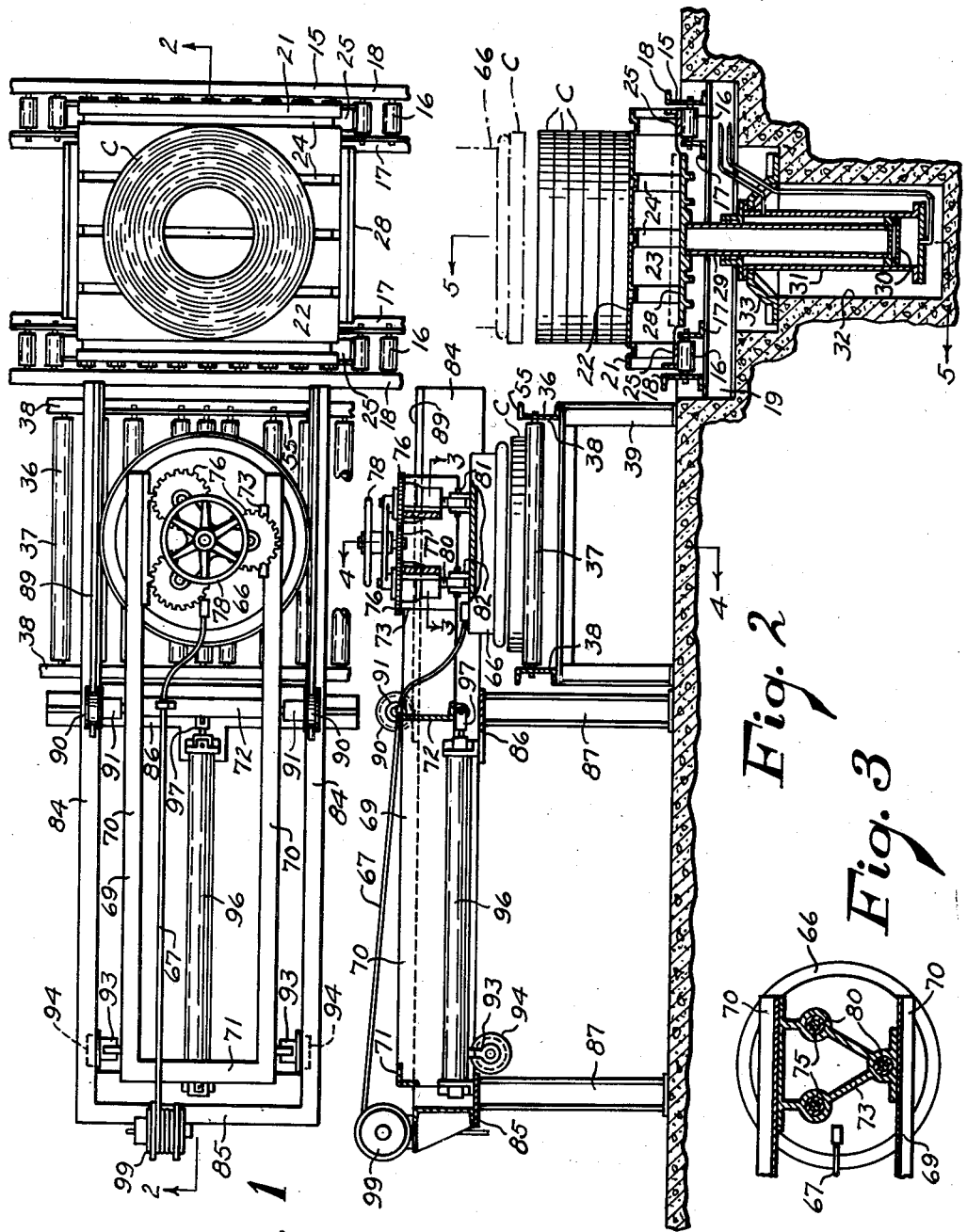

2,565,927

UNITED STATES PATENT OFFICE 2,565,927

APPARATUS FOR HANDLING ANNULAR ARTICLES

Myles Morgan, Worcester, Mass., assignor to Morgan Construction Company, Worcester, Mass., a corporation of Massachusetts Application June 28, 1947, Serial No. 757,735

10 Claims. (Cl. 214—6)

1

This invention relates to apparatus for handling annular articles, and more particularly to apparatus for conveying and piling annular coils of strip metal, such as steel.

It is one object of the invention to provide an apparatus which will greatly reduce the amount of manual labor required in the handling of annular articles.

It is a further object of the invention to provide an apparatus capable of receiving annular articles such as coils of strip steel, which arrive one at a time, and adapted to arrange such coils in piles for convenience in subsequent handling.

It is a further object of the invention to provide a new and advantageous conveyor of the idler roller type, together with an improved form of pallet arranged to be supported on the conveyor and to receive metal coils or other articles.

It is a further object of the invention to provide a strong and rugged pallet of a comparatively light and inexpensive construction, capable of being transported on a roller conveyor as well as by a lift truck of the usual type.

With these and other objects in view, as will be apparent to those skilled in the art, the invention resides in the combination of parts set forth in the specification and covered by the claims appended hereto.

Referring to the drawings illustrating one embodiment of the invention and in which like reference numerals indicate like parts, Fig. 1 is a plan view of an apparatus for conveying and piling annular coils of strip steel;

Fig. 2 is a section taken on the line 2—2 of Fig. 1;

Fig. 3 is a section taken on the line 3—3 of Fig. 2;

Fig. 4 is a section taken on the line 4—4 of Fig. 2;

Fig. 5 is a section taken on the line 5—5 of Fig. 2;

Fig. 6 is a section taken on the line 6—6 of Fig. 4;

Fig. 7 is a diagram of the electrical wiring used in connection with certain controls forming a portion of the apparatus;

Figure 8:
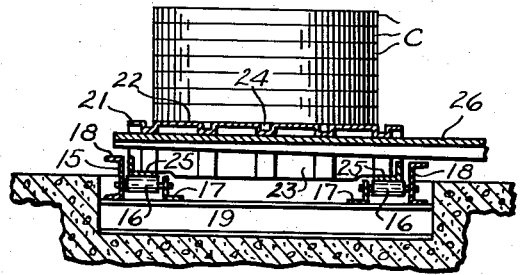
Fig. 8 is a section taken on the line 8—8 of Fig. 5.

The embodiment illustrated comprises a pallet conveyor 15 including two parallel rows of comparatively short horizontal idler rollers 16, the rows being horizontal and spaced a substantial distance apart. The rollers 16 in each row are supported between an inner horizontal beam 17

2 of L cross section and an outer horizontal beam 18 of channel cross section. These beams 17 and 18 are mounted on transversely extending ties 19.

Figure 9:
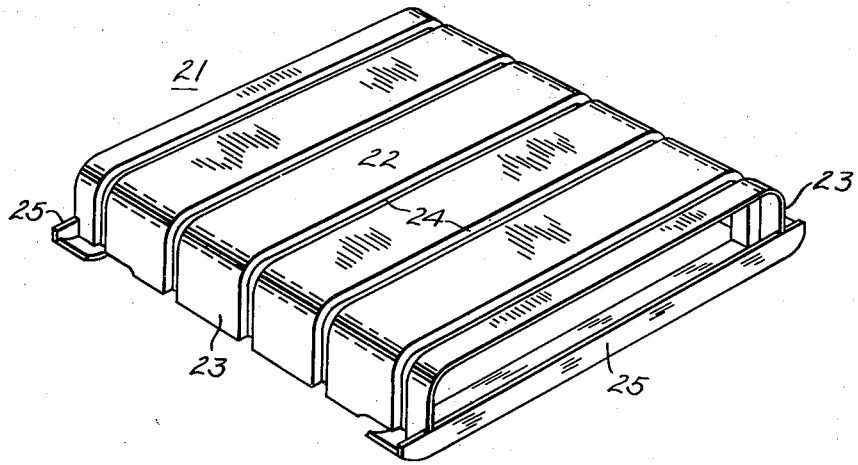
Fig. 9 is a perspective view of a pallet.

The conveyor 15 is arranged to support a series of pallets or skids 21. Each of these pallets, as best shown in Fig. 9, comprises a metal sheet providing a horizontal table 22 and two opposite end walls 23 extending downwardly from the table. Longitudinally extending corrugations 24 are preferably formed in the sheet to increase its strength and stiffness. Two horizontal runners 25 are provided at opposite sides of the sheet and are welded or otherwise secured to the lower corners of the end walls 23. Each runner 25 is preferably of L cross section, with a horizontal leg or flange at the bottom and a vertical leg or flange at the outer side. The runners extend slightly beyond the end walls 23, the lower surfaces of the extended portions being curved upwardly. The spacing between the runners is such that they may rest upon the respective rows of conveyor rollers 16, as shown in Fig. 8. Sufficient space is provided between the table 22 and the tops of the runners 25 to permit the insertion of the horizontal tongue or blade 26 of an ordinary lift truck, which may be employed to remove pallets from the conveyor or to replace them thereon.

Means is associated with the pallet conveyor 15 whereby each pallet 21 may be raised and lowered in a desired manner as it reaches a predetermined position along the conveyor. For this purpose an elevator platform 28 is provided between the two rows of idler rollers 16, this platform being of the proper size and shape to engage the lower edges of the end walls 23 of the pallet. The platform 28 is supported on the upper end of a hollow piston rod 29 which has a piston 30 on its lower end. The piston is slidable within a vertical cylinder 31 which is located within a pit 32 and supported by a bracket 33. The cylinder 31 and its associated parts form a fluid motor, and it will be understood that hydraulic pressure fluid may be supplied to the motor in a well-known manner under manual control to raise or lower the platform 28. In order to prevent the platform from turning, a vertical rod 34 (Fig. 5) extends downwardly therefrom through a guide opening in the bracket 33.

Each pallet 21 is adapted to receive a stack or pile of annular coils C of strip metal, such as steel, which are placed upon the pallet one at a time while it is supported by the elevator platform 28. In order to deliver the coils into position for the piling operation, there is provided a coil conveyor 36 comprising a row of comparatively long horizontal idler rollers 37 which are supported at their ends in two spaced parallel beams 38. These beams are mounted on a suitable supporting structure 39, and they are preferably slightly inclined so that the coils will travel along the conveyor by the action of gravity. The coil conveyor 36 is located close to the pallet conveyor 15 at one side thereof, but at a somewhat higher elevation. As viewed in plan, the two conveyors are parallel.

Means is provided to stop each coil C automatically as it reaches a position directly opposite the elevator platform 28. For this purpose a bracket 41 (Figs. 4 and 6) is secured to the beams 38 to provide a guideway for a vertically slidable plunger 42 which carries on its upper end a dog 43 arranged to be projected upwardly into the hollow center or eye of the coil. Since all the coils will ordinarily be formed upon the same arbor or coiling block, they will all have eyes of the same diameter, although the outside diameters of the coils may vary occasionally. Consequently, the effect of the dog 43 will be to stop each coil with its axis in a definite position, regardless of its outside diameter. The plunger 42 is moved up and down by a fluid motor 44 carried by the bracket 41 and supplied with pressure fluid (such as compressed air) from a pipe 45 (Fig. 7) under the control of a four-way solenoid valve 46 having a solenoid 47. The solenoid is connected in a circuit with a suitable source 49 of electrical energy through two switches 50 and 51. The switch 50 is manually controlled and is normally closed. The switch 51 is normally open, and is arranged to be closed automatically by a lever 52 (Fig. 4) when the upper end of this lever is moved downwardly by the advancing portion of a coil, the lever being biased against such movement by a tension spring 53.

Such automatic closure of the switch 51 will energize the solenoid 47, thereby actuating the valve 46 and causing the motor 44 to project the plunger 42 and the dog 43 upwardly into the eye of the coil to stop further movement thereof along the conveyor. By opening the switch 50, the operator can de-energize the solenoid 47 and cause the dog 43 to be retracted, so that the coil will be released and will continue to travel along the conveyor 36 rather than be transferred laterally to the elevator platform 28, as will be described hereinafter. Ordinarily only undersize or otherwise defective coils will be released in this manner.

In order to avoid any possible interference by the dog 43 with the lateral movement of the coils, the dog is pivotally mounted on the plunger 42, as best shown in Fig. 6, and biased toward its upright position by means of a tension spring 54. For a similar reason, the upper portion of the beam 38 nearest the pallet conveyor is cut away to form a shallow notch 55 adjacent the elevator platform 28.

Means is provided to stop the coils C as they travel downwardly along the conveyor 36 and approach the dog 43, the said means being controlled manually to release one coil at a time. For this purpose there is shown an escapement mechanism comprising a vertically movable stop member 57 (Fig. 4) located between two of the conveyor rollers 37 a short distance anterior to the dog 43, and a group of brake shoes 58 mounted on a vertically movable bar 59 and arranged to engage the lower surface of several of the rollers 37 anterior to the stop member 57. There are sufficient unbraked rollers 37 between the stop member 57 and the brake shoes 58 to accommodate one of the coils C. A fluid motor 60 is connected to the stop member 57 by a link 61 and bell crank 62, and to the brake bar 59 by a link 63 and bell crank 64, the construction being such that when the stop member 57 is raised the bar 59 will be lowered, and vice versa. In known manner, the motor 60 will be supplied with pressure fluid, such as compressed air, under the control of a manually operable four-way valve (not shown). It will be apparent that when the stop member 57 is raised to its operative position to stop one coil, the brake shoes will be released to permit the following coil to come into contact with the first coil. When the stop member is withdrawn to release the first coil, the brake shoes will be applied to hold the following coil stationary.

The invention provides a mechanism for transferring coils laterally, one at a time, from the coil conveyor 36 to a pallet 21 supported on the elevator platform 28, thus forming a pile or stack of superimposed coils on such pallet. For this purpose there is provided an electro-magnet 66 which can be moved horizontally back and forth between a position directly above the coils, as they are stopped by the dog 43, and a position directly above the elevator platform 28. A flexible cable 67 supplies this magnet with electric current, under the control of the operator.

In order to support the magnet there is provided a carriage 69 comprising a pair of spaced parallel horizontal beams 70 extending at right angles to the conveyors 15 and 36. These beams are connected at their rear ends by a cross-member 71, at points intermediate their length by a cross-member 72, and near their front ends by a bracket 73. This bracket provides a support for three rotatable nuts or internally threaded sleeves 75, with their axes vertical, each nut having a gear 76 on its upper end. The three gears 76 mesh with a central pinion 77 which can be rotated by means of a handwheel 78. Within each nut 75 there is provided a threaded rod or screw 80 having its lower end enlarged and pivotally connected by a transverse pin 81 to upright ears 82 on the top of the magnet 66. The magnet is suspended by the screws 80 with its lower surface parallel with and slightly higher than the upper surface of the coil C as the latter is stopped by the dog 43, as shown in Fig. 4. By turning the handwheel 78, the operator can raise or lower the magnet to accommodate coils of different widths.

The carriage 69 is slidably supported by a stationary framework comprising two horizontal beams 84 located at opposite sides of the carriage beams 70 and parallel therewith. The beams 84 are connected at their rear ends by a cross-member 85, and at points intermediate their length by a cross-member 86, these parts being supported on columns 87. The front portions of the beams 84 extend across the coil conveyor 36, and on their upper surfaces there are formed ribs or rails 89 to support double-flanged wheels 90 carried by brackets 91 which are attached to the outer sides of the carriage beams 70, near the cross member 72. Two other brackets 93 are attached to the outer sides of the carriage beams 70 near the rear ends thereof, and these brackets 93 support two single flanged wheels 94 which engage the lower surfaces of the beams 84. It will be understood that the weight of the magnet 66, added to the weight of the portion of the carriage in front of the wheels 90, is sufficient to over-balance the weight of the rear portion of the carriage and thus hold the rear wheels 94 in contact with the beams 84.

By sliding the carriage 69 forwardly from its retracted position, the magnet 66 may be moved from a position above the coil conveyor 36 to a position above the elevator platform 28, as indicated by the broken lines in Fig. 2. This movement of the carriage is preferably effected by a power actuated mechanism, and for this purpose a fluid motor 96 is supported at its opposite ends on the respective cross-members 85 and 86, between the two beams 84. A piston rod 97 extends from the front end of this motor and connects with the cross-member 72 of the carriage. It will be understood that the motor 96 will be supplied with pressure fluid under the control of a manually operable four-way valve, in a well-known manner, so that the carriage 69 may be moved forwardly and rearwardly as desired. In order to control the cable 67 during the movements of the carriage, a portion of the cable is preferably coiled on a spring-actuated cable reel 99 of well-known construction, which will pay off cable during forward carriage travel and coil up cable during rearward carriage travel.

The operation of the invention will now be apparent from the above disclosure. A supply of empty pallets 21 will be provided on the conveyor 15 at the left side of the elevator platform 28, as shown in Fig. 5, with their runners 25 resting on the conveyor rollers 16. The platform 28 will be lowered by means of the motor 31, and an empty pallet will be pushed along the conveyor to a position directly above the platform, whereupon the platform will be raised until the upper surface of the pallet is only slightly lower than the tops of the adjacent rollers 37 of the coil conveyor 36. Coils C will be supplied to the upper end of the conveyor 36 and will descend along the same by gravity, with the lowermost coil resting against the stop member 57 (Fig. 4). The operator will retract this stop member by means of the motor 60, which will at the same time apply the brake shoes 58. The lowermost coil C will then descend by gravity until it engages and depresses the lever 52, closing the switch 51, energizing the solenoid 47 of the valve 46, and causing the motor 44 to raise the plunger 42 and project the dog 43 into the eye of the coil to stop the coil as it reaches a position directly beneath the magnet 66. This may be referred to as the unloading position or station. The operator will then reverse the motor 60 to raise the stop member 57 and release the brake shoes 58, so that the following coil may descend further into contact with the stop member. The magnet 66 will now be energized, causing the coil C therebeneath to jump upwardly through the short intervening space into contact with the lower surface of the magnet, whereupon the carriage 69 will be moved forwardly by means of the motor 96 to bring the magnet and coil directly above the empty pallet on the elevator platform 28. The operator will then de-energize the magnet to drop the coil on to the pallet, and then retract the carriage so that the magnet may pick up the next coil. Before the carriage is moved forwardly again, the platform 28 will be lowered, by means of its motor 31, a distance approximating the width of one coil. In this manner each coil may be superimposed on the preceding coil to form a stack or pile of coils. When this pile has reached a desired height, the platform 28 will be lowered to permit the loaded pallet to rest on the conveyor rollers 16 and be pushed along the conveyor 15, so that another empty pallet may be brought into position above the platform to receive the next coil. Loaded pallets may be removed from the conveyor 15 by means of the usual lift truck with its tongue or blade 26, which may enter the open side of the pallet as shown in Fig. 8.

Since the dog 43 is laterally yieldable against the tension of its spring 54 (Fig. 6) it will not interfere with the removal of the coils from the conveyor 36 even though the magnet does not lift the coils sufficiently to clear the dog. By opening the switch 50 (Fig. 7) the operator may hold the dog 43 of Fig. 4 in its retracted position, so that any particular coil may be allowed to continue downwardly along the conveyor 36 past the magnet. In this manner the operator can avoid transferring to the piles any coils which are too small in outside diameter or which are for any other reason defective. The pallets 21 are of very light, simple, and inexpensive construction, and yet unusually strong and rugged.

Having thus described my invention, what I claim as new and desire to secure by Letters Patent is:

1. Apparatus for handling annular articles of magnetic material, such as coils of strip steel, comprising a conveyor along which articles may travel to an unloading station, a platform located at one side of the unloading station, means to raise and lower the platform, a pallet supported on the platform, and an electro-magnet movable back and forth in a generally horizontal path between a position above the unloading station and a position above the platform to transfer articles from the unloading station to the pallet and form a pile of superimposed articles thereon.

2. Apparatus for handling annular articles of magnetic material, such as coils of strip steel, comprising a downwardly inclined series of idler conveyor rollers along which articles may travel under the influence of gravity to an unloading station, means to stop each article at the unloading station, a platform located at one side of the unloading station, means to raise and lower the platform, a pallet supported on the platform, and an electro-magnet movable back and forth in a generally horizontal path between a position above the unloading station and a position above the platform to transfer articles from the unloading station to the pallet and form a pile of superimposed articles thereon.

3. Apparatus as set forth in claim 2, in which an escapement mechanism is provided in advance of the unloading station to stop the downwardly traveling articles and release them to the unloading station one at a time as required.

4. Apparatus as set forth in claim 2, in which manually operable means is provided to release any selected article from the unloading station for further downward travel along the conveyor rollers.

5. Apparatus for handling annular articles of magnetic material, such as coils of strip steel, comprising a downwardly inclined series of idler conveyor rollers along which articles may travel, a dog located between two of the rollers, means to project the dog upwardly into the hollow center of each article to stop the article at an unloading station, a platform located at one side of the unloading station, means to raise and lower the platform, a pallet supported on the platform, and an electro-magnet movable back and forth in a generally horizontally path between a position above the unloading station and a position above the platform to transfer articles from the unloading station to the pallet and form a pile of superimposed articles thereon.

6. Apparatus as set forth in claim 5, in which the dog is yieldable in a lateral direction toward the platform, so that the dog cannot interfere with the removal of the articles from the unloading station by the electro-magnet.

7. Apparatus as set forth in claim 5, in which the dog is projected upwardly by means responsive to a control device, the control device being arranged for actuation by the front portion of each article as it approaches the unloading station.

8. Apparatus for handling annular articles of magnetic material, such as coils of strip steel, comprising a conveyor along which articles may travel to an unloading station, a platform located at one side of the unloading station, means to raise and lower the platform, a pallet supported on the platform, a carriage movable back and forth in a generally horizontal path between a position above the unloading station and a position above the platform, an electro-magnet supported by the carriage to transfer articles from the unloading station to the pallet and form a pile of superimposed articles thereon, and a stationary horizontal guideway supporting the carriage.

9. Apparatus as set forth in claim 8, in which the electro-magnet is connected to the carriage by means which is adjustable manually to vary the height of the electro-magnet relative to the carriage.

10. Apparatus for handling annular articles of magnetic material, such as coils of strip steel, comprising a conveyor along which articles may travel to an unloading station, two spaced parallel rows of idler rollers extending past the unloading station and at a considerably lower elevation than the said station, a platform located between the said two rows and adjacent to the unloading station, means to raise and lower the platform, a pallet supported on the platform and having parts arranged to rest on the said idler rollers when the platform is fully lowered, and an electro-magnet movable back and forth in a generally horizontal path between a position above the unloading station and a position above the platform to transfer articles from the unloading station to the pallet and form a pile of superimposed articles thereon.

MYLES MORGAN.

REFERENCES CITED

The following references are of record in the file of this patent:

UNITED STATES PATENTS

| Number | Name | Date |
| --- | --- | --- |
| 1,129,775 | Anthony | Feb. 23, 1915 |
| 1,639,576 | Semashko | Aug. 16, 1927 |
| 1,904,720 | Douglass | Apr. 18, 1933 |
| 2,065,674 | Fay | Dec. 29, 1936 |
| 2,228,887 | Peterson | Jan. 14, 1941 |
| 2,395,982 | White | Mar. 5, 1946 |
| 2,431,320 | Fischer | Nov. 25, 1947 |